United States Patent [19]
Soeffge et al.

[11] Patent Number: 5,482,321
[45] Date of Patent: Jan. 9, 1996

[54] SUBFRAME CROSS MEMBER

[75] Inventors: Friedhelm Soeffge, Leonberg-Gebersheim; Rudolf Kronewitter, Böblingen; Ralph Michalski, Vaihingen, all of Germany

[73] Assignee: Dr. Inc. h.c.F. Porsche AG, Germany

[21] Appl. No.: 148,230

[22] Filed: Nov. 8, 1993

[30] Foreign Application Priority Data

Nov. 6, 1992 [DE] Germany ............... 42 37 533.9

[51] Int. Cl.⁶ ................................................ B62D 21/12
[52] U.S. Cl. ...................... 280/781; 296/204; 296/29; 52/641
[58] Field of Search ........................... 280/781, 785, 280/795; 52/86, 639, 641; 296/204, 29; 105/397, 404

[56] References Cited

U.S. PATENT DOCUMENTS

| | | | |
|---|---|---|---|
| 1,647,084 | 10/1927 | Curtis | 280/785 |
| 3,646,725 | 3/1972 | Troutner | 52/641 |
| 5,280,957 | 1/1994 | Hentschel et al. | 280/723 |

FOREIGN PATENT DOCUMENTS

| | | | |
|---|---|---|---|
| 0530594 | 3/1993 | European Pat. Off. | 280/785 |
| 1278855 | 5/1969 | Germany . | |
| 3927987 | 2/1991 | Germany | 280/781 |
| 3271078 | 12/1991 | Japan | 280/781 |
| 0844444 | 7/1981 | U.S.S.R. | 280/781 |

Primary Examiner—Margaret A. Focarino
Assistant Examiner—Paul N. Dickson
Attorney, Agent, or Firm—Evenson, McKeown, Edwards & Lenahan

[57] ABSTRACT

A cross member for a motor vehicle subframe is disposed between at least two adjoining sides extending lengthwise of the vehicle as a receptacle for a wheel suspension. The cross member comprises two supports of identical configuration, located in a transverse plane and made angular. The upper transverse legs of the supports each have a tongue located endwise, and the tongues overlapping in a vertical plane. Each tongue has a thickened receptacle for supporting a threaded nut and another receptacle for supporting a bolt head of mounting bolts located in a horizontal plane.

6 Claims, 3 Drawing Sheets

SUBFRAME CROSS MEMBER

BACKGROUND AND SUMMARY OF THE INVENTION

The present invention relates to a cross member for a subframe, and more particularly, to a cross member for a motor vehicle subframe located at least between two adjoining sides extending in the lengthwise direction of the vehicle to receive a wheel suspension.

DE 12 78 855 discloses a subframe having a one-piece cross member welded to the sides. However, such a construction is not width-wise adjustable and does not ensure improvement of toe-in behavior or resistance to tipping.

An object of the present invention is to provide a cross member for a subframe of a motor vehicle with which, when combined with sides, a stable structural unit can be manufactured and with which improvement of toe-in behavior as well as resistance to tipping are ensured. In addition, the two parts of the cross member are constructed to be adjustable in width.

This object has been achieved according to the present invention by providing two angular supports of identical configuration located in a transverse plane of the subframe and having upper transverse legs, each with a tongue at an end of the support, said tongues overlapping in a vertical plane having a thickened receptacle as a support on a horizontal plane for a threaded nut and another receptacle as a support for a bolt head of mounting bolts.

Primary advantages achieved with the invention include the cross member being composed of two parts of identical structure connected in the central lengthwise axis of the vehicle by two mounting bolts disposed in a horizontal plane. For simple adjustment of the cross member with respect to the sides of the subframe, the mounting bolts are each guided in an elongated hole in a receptacle in the support.

The supports have tongues on transverse horizontally aligned legs of the connecting area. The tongues are overlapped in the mounting position and do not exceed the width of the cross member. Each of the tongues has two receptacles for the mounting bolts, one of the receptacles having an elongated hole for adjusting the cross member parts widthwise.

The legs of the supports run approximately vertically and are connected with sides on which a wheel suspension or connecting rod of the suspension of a motor vehicle is mounted. In order to be able to counteract an inadvertent movement of the wheel, a rigidly connected subframe composed of the cross member and the sides is required. The cross member makes an important contribution in this regard because it has low weight and also has a high torsional resistance. Thus, generally speaking, the toe-in behavior of the axle is not adversely affected.

The area between the two bolts connecting to the sides is made especially resistant to torsion, using a closed I-profile with cross ribs in this area. The adjoining leg extends in an approximately horizontal plane and requires only a configuration of the support for resistance to tension, compression, and bending. For this purpose, an open I-section with ribs surrounding the receptacles is required.

The connection of the two supports with one another by two mounting bolts supports the side in terms of its resistance to tipping, so that undesired wheel changes under the influence of force are eliminated.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
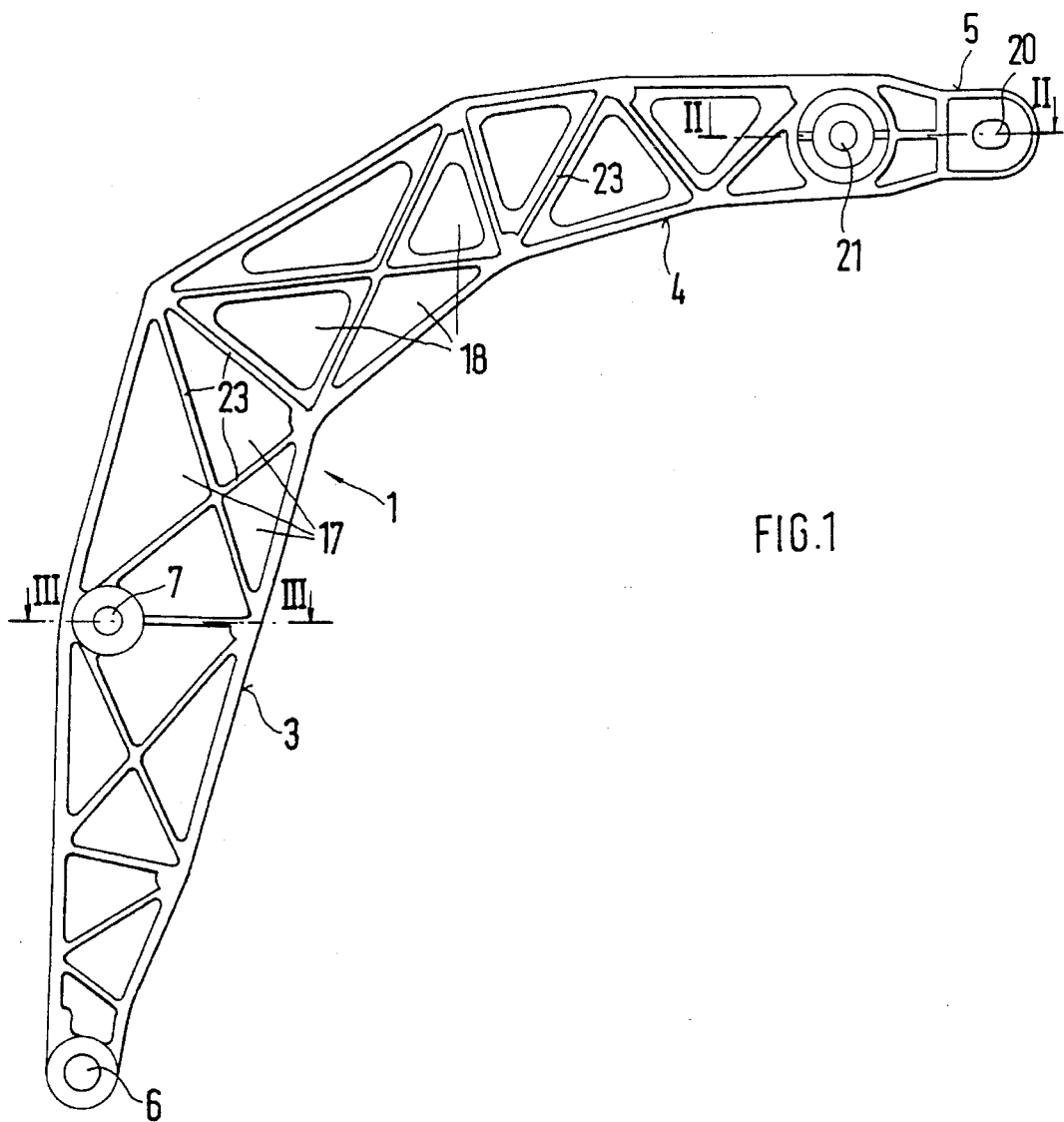
FIG. 1 is a front view of a left support as viewed in the direction of travel.

The cross member comprises two supports 1 of identical structure, with only a left support shown in FIG. 1. This left support 1 is connected with a vehicle side 2 (FIG. 3) to which connecting rods of a wheel suspension for a motor vehicle are articulated.

Figure 2:
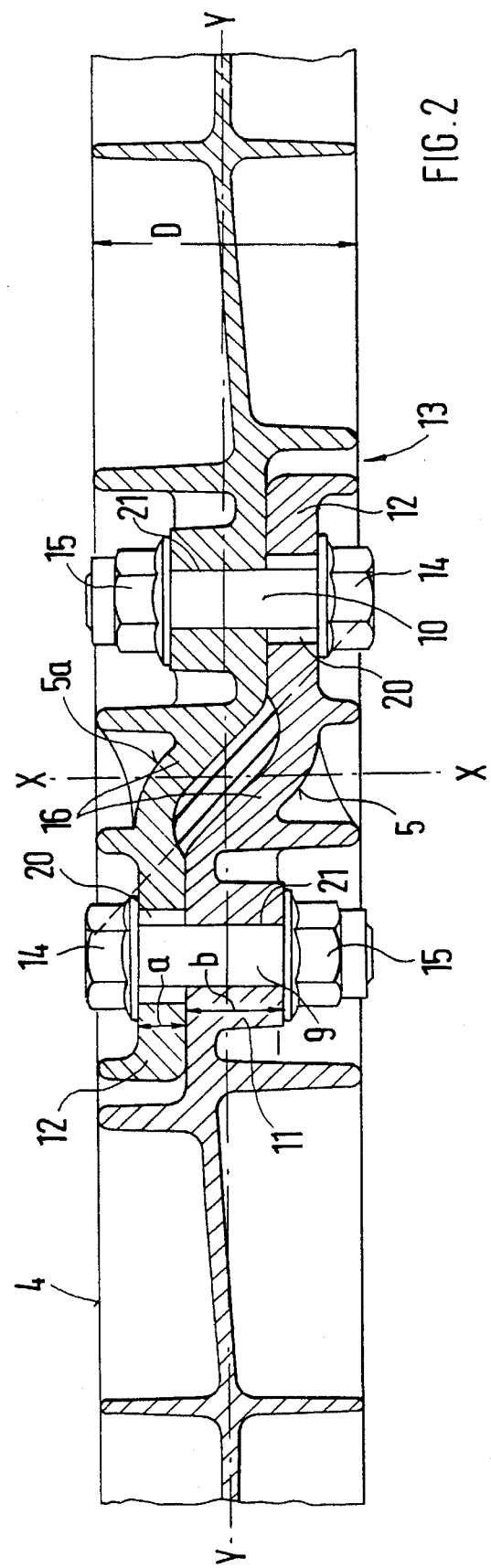
FIG. 2 is a sectional view along line II—II in FIG. 1, and also showing a portion of the right support in cross section.

Support 1 is configured to be angular and comprises one approximately vertical leg 3 and an adjoining upper, transverse, approximately horizontally aligned additional leg 4, which has at its end a tongue 5, with the right support, as shown in FIG. 2, having a tongue 5a.

Figure 3:
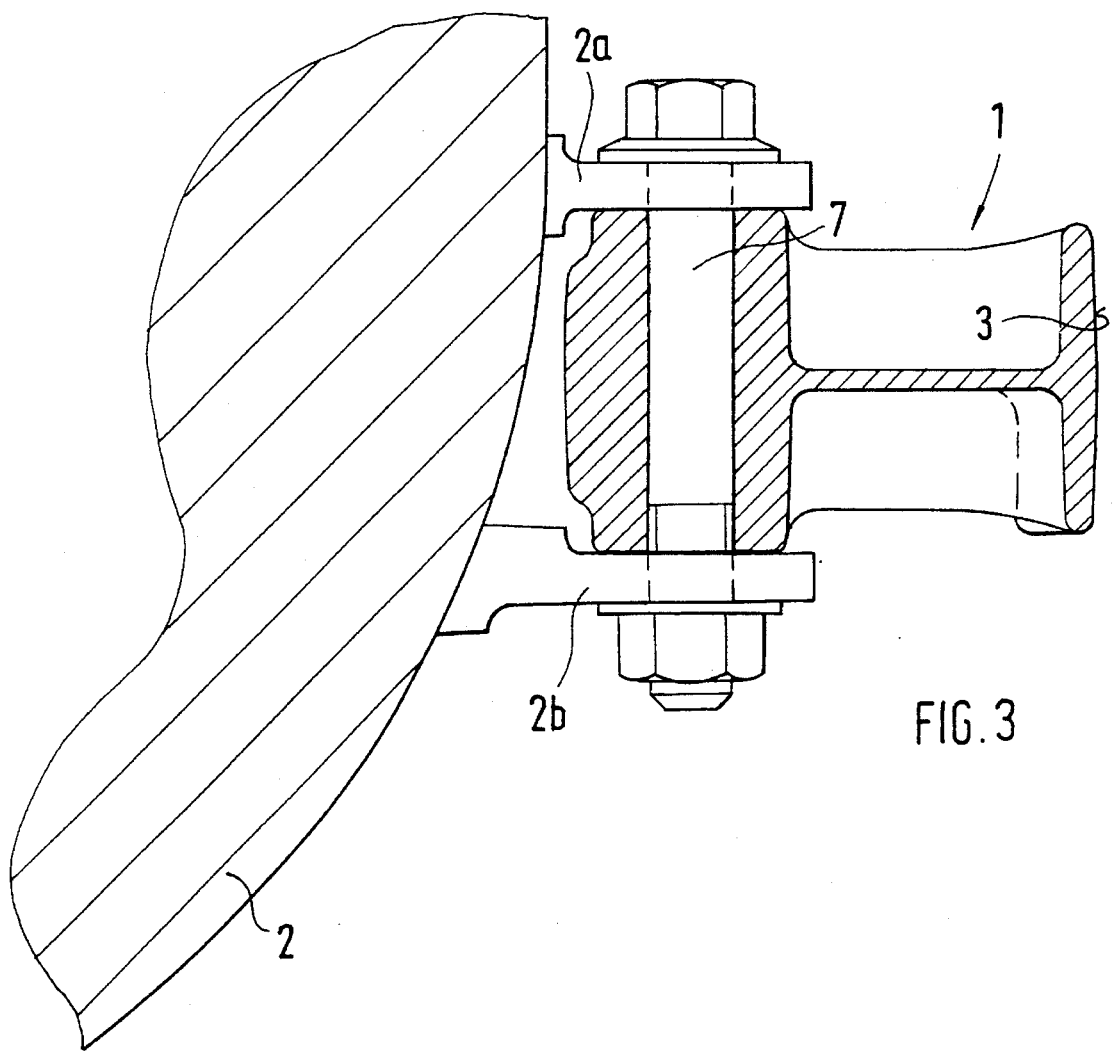
FIG. 3 is a sectional view along line III—III of FIG. 1 through a connection of the support to the side of a subframe.

Connection of the cross member support 1 to side 2 is accomplished by two mounting bolts 6, 7, located and spaced above one another in the vertical portion of leg 3. Ribs 2a, 2b are provided on the side 2, between which the member 1 is tensioned and held as seen in FIG. 3.

Mounting of the two left and right supports 1 to one another is accomplished in the vicinity of tongues 5, 5a in a central lengthwise plane X—X of the vehicle by two bolts 9, 10. Tongues 5, 5a overlap and are each molded or otherwise integrated endwise on approximately horizontal leg 4 and provided with two receptacles 11, 12 for the mounting bolts 9 and 10. The receptacle 12 at free end 13 supports the head 14 of bolts 9, 10 and the other receptacle 11 supports the nuts 15, 14 of bolts 9, 10. Tongues 5, 5a each have a shoulder 16 with respect to receptacles 11 to receptacle 12, and the shoulder 16 runs at an angle to the central lengthwise axis Y—Y of support 1. Mounting bolts 9, 10 are guided in the receptacles 12, each in an elongated hole 20 and in the additional receptacle 11 in cylindrical bores 21.

Tongues 5, 5a are so sized that the thickness D of the I-section profile in the connecting area is not exceeded. A less sharply dimensioned receptacle 12 with thickness a is opposite a more sharply dimensioned receptacle 11 with thickness b.

The vertical segment of leg 3 of the I-section support consists of a closed profile with a continuous wall 17, while approximately horizontal segment 4 consists of an open I-section, i.e. the wall is provided with openings 18. For reinforcement, cruciform ribs 23 are provided in both the vertical and horizontal areas of legs 3, 4 of the support 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle subframe, comprising a cross member located at least between two adjoining vehicle subframe sides extending in the lengthwise direction of the vehicle for reception of a wheel suspension wherein a portion of the cross member is retained by two mounting bolts on a side of the motor vehicle subframe, said bolts being spaced from each other in a vertical distance and extending in the lengthwise direction of the vehicle, and the cross member has two angular supports of identical configuration located in a transverse plane of the subframe, each having an upper transverse leg and a tongue at an end of the support, said tongues overlapping in a vertical plane, each tongue having a thickened receptacle as a support on a horizontal plane for a threaded nut and another receptacle as a support for a bolt head of a support mounting bolt.

2. The cross member according to claim 1, wherein a vertically directed leg of the cross member consists of a closed I-section with ribs and the upper transverse legs of the supports consist of an open I-section with openings bounded by ribs.

3. The cross member according to claim 1, wherein each of the tongues is arranged on a free end on the upper transverse leg of the supports in an overlapping mounting arrangement corresponding to a total thickness of the cross member, and each of the another receptacles is opposed to each of the respective thickened receptacles, with a shoulder being provided between the two receptacles, said shoulder running at an angle to the central lengthwise plane of the cross member.

4. The cross member according to claim 3, wherein a vertically directed leg of the cross member consists of a closed I-section with ribs and the upper transverse legs of the supports consist of an open I-section with openings bounded by ribs.

5. The cross member according to claim 1, wherein the support mounting bolts are each disposed in an elongated hole in each of the another receptacles, with each of the thickened receptacles having a cylindrical bore diameter corresponding to the diameter of the support mounting bolts.

6. The cross member according to claim 5, wherein a vertically directed leg of the cross member consists of a closed I-section with ribs and the upper transverse legs of the supports consist of an open I-section with openings bounded by ribs.

* * * * *